US010940824B2

(12) United States Patent
Nagasawa (10) Patent No.: US 10,940,824 B2
(45) Date of Patent: Mar. 9, 2021

(54) PASSENGER PROTECTION APPARATUS (71) Applicant: SUBARU CORPORATION, Tokyo (JP)

(72) Inventor: Isamu Nagasawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 56 days.

(21) Appl. No.: 16/445,381

(22) Filed: Jun. 19, 2019

(65) Prior Publication Data
US 2020/0101931 A1 Apr. 2, 2020

(30) Foreign Application Priority Data

Sep. 28, 2018 (JP) .............................. JP2018-185726

(51) Int. Cl.
B60R 21/2342 (2011.01)
B60R 21/207 (2006.01)
B60R 21/231 (2011.01)

(52) U.S. Cl.
CPC ........ B60R 21/2342 (2013.01); B60R 21/207 (2013.01); B60R 21/231 (2013.01); B60R 2021/23107 (2013.01)

(58) Field of Classification Search
None
See application file for complete search history.

(56) References Cited

U.S. PATENT DOCUMENTS

| 2004/0232681 | A1* | 11/2004 | Adomeit | B60R 21/231 280/743.1 |
| 2007/0013177 | A1 | 1/2007 | Abe | |
| 2016/0288762 | A1* | 10/2016 | Deng | B60R 21/2342 |
| 2017/0355342 | A1* | 12/2017 | Deng | B60R 21/235 |
| 2018/0056920 | A1* | 3/2018 | Paxton | B60R 21/233 |
| 2019/0023214 | A1* | 1/2019 | Kitagawa | B60R 21/207 |
| 2019/0283703 | A1* | 9/2019 | Marciniak | B60R 21/235 |
| 2019/0389420 | A1* | 12/2019 | Dry | B60R 21/231 |
| 2020/0101921 | A1* | 4/2020 | Nagasawa | B60R 21/2334 |
| 2020/0101927 | A1* | 4/2020 | Nagasawa | B60R 21/237 |
| 2020/0101930 | A1* | 4/2020 | Nagasawa | B60R 21/2155 |

FOREIGN PATENT DOCUMENTS

| JP | 2007-022306 A | 2/2007 |
| JP | 2010-047182 A | 3/2010 |
| JP | 2013-018378 A | 1/2013 |

OTHER PUBLICATIONS

Japanese Office Action dated Sep. 17, 2019 for Japanese Patent Application No. 2018-185726 (3 pages in Japanese, with English Translation).

* cited by examiner

Primary Examiner — Drew J Brown
(74) Attorney, Agent, or Firm — Smith, Gambrell & Russell, LLP (57) ABSTRACT A passenger protection apparatus for a vehicle includes: an inflator configured to generate gas upon receiving a predetermined actuating signal; and an airbag body folded and stored in an unactuated condition, and configured to deploy by supplying the gas from the inflator to the airbag body. The airbag body includes a predetermined area on which adhesive is applied. After deployment of the airbag body, the predetermined area adheres to an adherend to hold a passenger, and the airbag body is torn off by a predetermined motion.

4 Claims, 10 Drawing Sheets

PASSENGER PROTECTION APPARATUS

CROSS-REFERENCE TO RELATED APPLICATIONS

The present application claims priority from Japanese Patent Application No. 2018-185726 filed on Sep. 28, 2018, and the entire contents of which are hereby incorporated by reference.

BACKGROUND

The disclosure relates to a passenger protection apparatus.

In order to protect a passenger from a collision and so forth, an airbag apparatus has been used in a vehicle such as an automobile. As this airbag apparatus, a front airbag configured to deploy backward in front of the passenger has been known. This front airbag is deployed at a frontal collision of the vehicle to support and protect the passenger moving forward.

In addition, in order to protect against a side collision, a side airbag and a curtain airbag are increasingly equipped in a vehicle. This curtain airbag is required to hold the internal pressure for a period of time, several seconds while the vehicle overturns, in order to absorb the impact to the head, and therefore there is a demand for improvement of the airtightness of the airbag and lengthen the expansion duration of the airbag. To address this demand, an airbag having improved strength and airtightness of a joined part with adhesive has been proposed, for example, in Japanese Unexamined Patent Application Publication No. 2010-047182 In addition, an airbag apparatus capable of easily setting the inner pressure of an airbag to a target value by using adhesive has been proposed, for example, in Japanese Unexamined Patent Application Publication No. 2007-022306. In this airbag apparatus, a sheet having an opening located over a vent hole is joined to the edge of the vent hole with a joiner, and, when the inner pressure of the airbag attains or exceeds a predetermined value, the joiner is released. The joiner is adhesive.

SUMMARY OF THE INVENTION

An aspect of the disclosure provides a passenger protection apparatus for a vehicle including an inflator and an airbag body. The inflator is configured to generate gas upon receiving a predetermined actuating signal; and an airbag body folded and stored in an unactuated condition, and configured to deploy by supplying the gas from the inflator to the airbag body. The airbag body includes a predetermined area on which adhesive is applied. Upon deployment of the airbag body, the predetermined area adheres to an adherend to hold a passenger, and, after the deployment, the airbag body is torn off by a predetermined motion.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve explain the principles of the disclosure.

DETAILED DESCRIPTION

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

Collisions of the vehicle are not limited to a frontal collision and a lateral collision, but various types of collisions in any direction, such as an oblique collision, are conceivable. However, it may not be possible to prepare airbags for each type of collision, because of the high cost and so forth. For example, the motion of the passenger is varied depending on the various types of collisions as described above, and therefore it is difficult for the airbag to surely hold the passenger in an exact contact area that allows the airbag to maximally absorb the collision energy. Consequently, it is not possible to successfully protect the passenger.

It is desirable to provide a passenger protection apparatus capable of improving the protection performance by surely holding the passenger regardless of varied motions of the passenger due to various types of collisions, and allowing the passenger to readily get out of the vehicle after the impact of the collision is absorbed.

Figure 1:
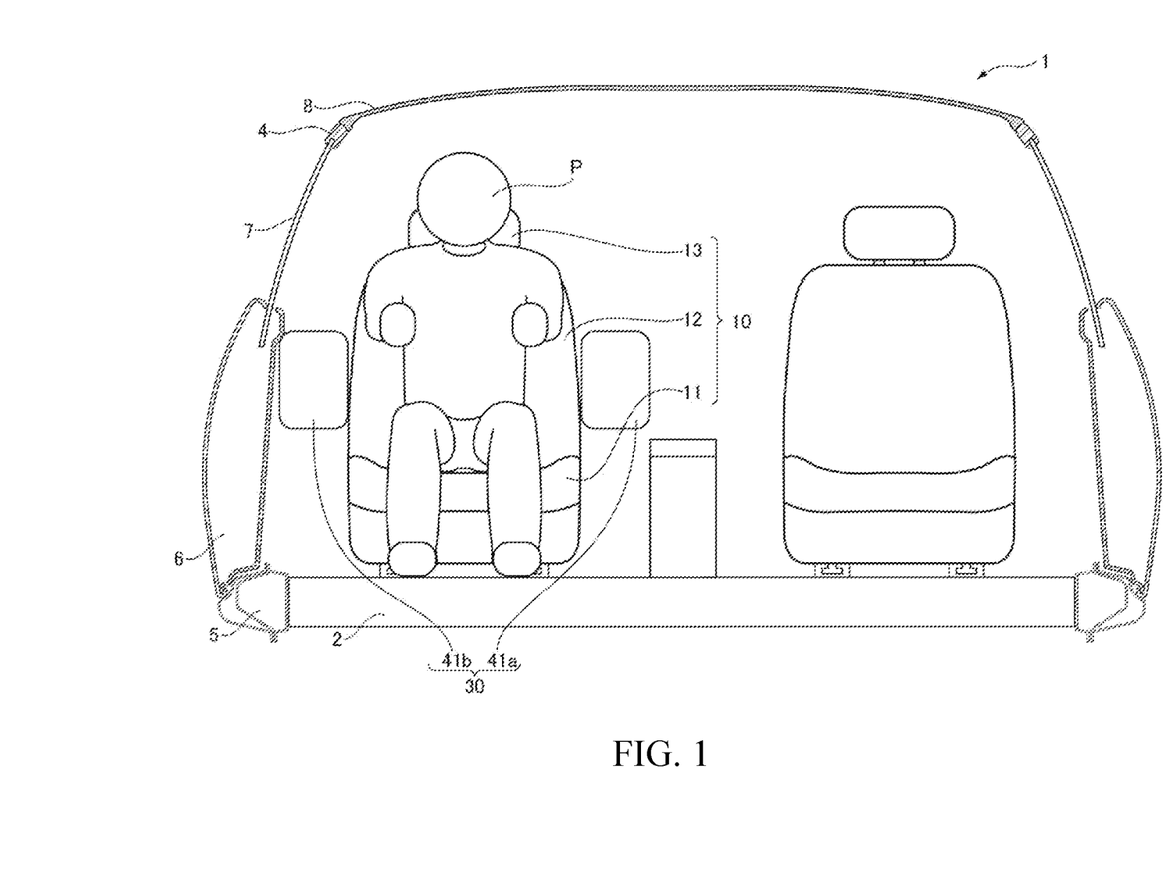
FIG. 1 is a cross-sectional view schematically illustrating a vehicle equipped with passenger protection apparatuses according to an embodiment of the disclosure.
Figure 2A:
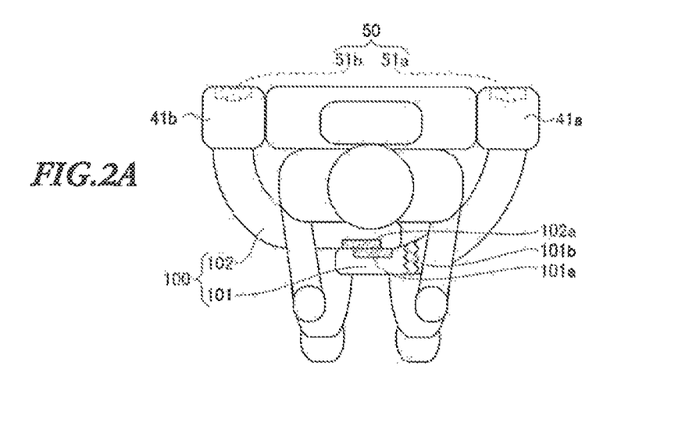
FIG. 2A is a top view illustrating a deployed airbag body of each of the passenger protection apparatuses according to the embodiment.
Figure 2B:
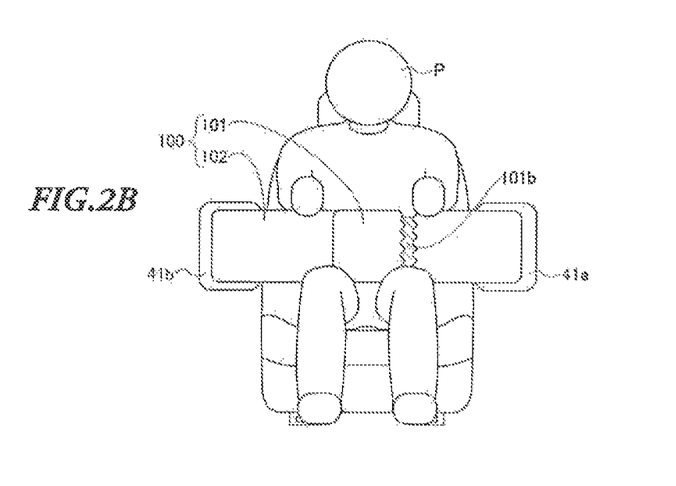
FIG. 2B is a front, view illustrating a deployed airbag body of each of the passenger protection apparatuses according to the embodiment.

FIG. 1 is a cross-sectional view schematically illustrating a vehicle equipped with passenger protection apparatuses according to an embodiment of the disclosure. FIG. 2A is a top view illustrating airbag bodies deployed by actuating the passenger protection apparatuses of the embodiment. FIG. 2B is a front view illustrating the airbag bodies deployed by actuating the passenger protection apparatuses of the embodiment.

<Configuration of Vehicle 1>

As illustrated in FIG. 1, seats 10 are provided on a floor surface 2 (on which a floor panel of an under body is mounted) of a vehicle 1. In addition, right and left center pillars forming inside walls of the vehicle body are provided facing one another outside the floor surface 2 in the vehicle width direction. The upper end of each of the center pillars is integrally coupled to a roof side rail 4, and the lower end of the center pillar is integrally coupled to a side sill 5. A front door 6 is provided in front of the center pillar, and a front door window 7 is provided above the front door 6. Moreover, a roof 8 is provided approximately horizontally above the roof side rails 4.

A passenger protection apparatus 30 is provided with each of the seats 10. The passenger protection apparatus 30 for the right seat 10 and the passenger protection apparatus 30 for the left seat 10 are symmetric. Hereinafter, the passenger protection apparatus 30 for the right seat 10 (the left side in FIG. 1) will be described as an example.

The seat 10 includes a seat cushion (seat bottom) 11 on which the hip and thighs of a passenger P rest, a seat back (backrest) 12 configured to recline, and a head rest (head portion) 13 configured to support the head of the passenger P.

<Configuration of Passenger Protection Apparatus 30>

The passenger protection apparatus 30 is controlled by, for example, an ACU (airbag deployment control unit) and an ECU (electronic control unit), based on detection signals from a collision detector for detection and prediction of a collision of the vehicle 1. The passenger protection apparatus 30 includes an inflator 50 and an airbag body 100.

<Inflator 50>

The inflator 50 ignites explosives upon receiving an actuating signal sent based on the detection or prediction of a collision of the vehicle 1 by the collision detector, and generates gas by the chemical reaction due to combustion. The gas generated by the inflator 50 is injected into the airbag body 100. The inflator 50 includes a first inflator 51a and a second inflator 51b described later.

<Airbag Body 100>

The airbag body 100 has a pouch shape into which the gas is injected by the inflator 50. When the airbag body 100 is not actuated, it is compactly folded. To actuate the airbag body 100, the inflator 50 injects the gas into the folded airbag body 100, so that the airbag body 100 is deployed to surround the sitting position of the passenger P. For example, the inward side of the airbag body 100 facing the passenger P is shorter than the outward side opposite to the passenger P, so that the airbag body 100 can deploy to surround the passenger P. The airbag body 100 includes an inward cloth section facing the passenger P, and an outward cloth section approximately opposite to the inward cloth section. Each of the inward cloth section and the outward cloth section has a base end portion into which the gas is injected, and a leading end portion. The base end portion and the leading end portion of the inward cloth section are partially sewn on one another outside the airbag body 100 by a tether with an adjusted length. By this mean, it is possible to deploy the airbag body 100 to surround the passenger P. In the airbag body 100, a tether to control the width of the airbag body 100 is provided between the inward cloth section and the outward cloth section. The airbag body 100 has two configurations: configuration A where the base end portion of the inward cloth section is sewn on the leading end portion of the outward cloth section by a tether; and configuration B where the base end portion of the inward cloth section is sewn on the leading end portion of the outward cloth section by the tether at a position closer to the front end than the configuration A. Moreover, the tether is shorter than the length of the airbag body 100 deployed without using the tether, from the point of the outward cloth section facing the point at which the tether is sewn on the base end portion of the inward cloth section to the point at which the tether is sewn on the front end portion of the outward cloth section. By this means, it is possible to deploy the airbag body 100 to surround the passenger P. In this case, the inward cloth section may be shorter than the outward cloth section. Alternatively, the airbag body 100 may be bent only in the configuration A, or may be bent in the configuration B in addition to the configuration A in multiple stages. Here, the airbag body 100 includes a first airbag body 101 and a second airbag body 102 described later.

When the passenger protection apparatuses 30 are not actuated, they are stored in a first storage case 41a and a second storage case 41b, respectively. The first storage case 41a is provided on the left side of the seat 100 (the right side of the passenger P in FIG. 1), and the second storage case 41b is provided on the right side of the seat 100 (the left side of the passenger P in FIG. 1) in the traveling direction of the vehicle 1. The first inflator 51a and the first airbag body 101 are stored in the first storage case 41a. Meanwhile, the second inflator 51b and the second airbag body 102 are stored in the second storage case 41b.

Figure 3A:
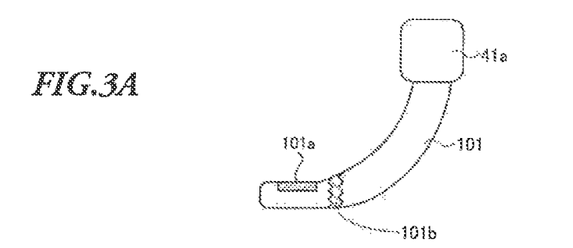
FIGS. 3A and 3C are top views illustrating a deploying airbag body.
Figure 3B:
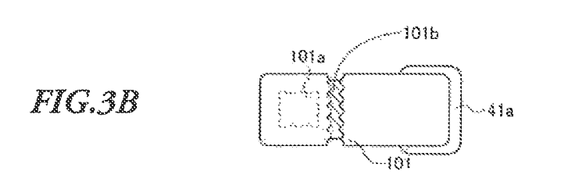
FIGS. 3B and 3D are front views illustrating a deploying airbag body.
Figure 3C:
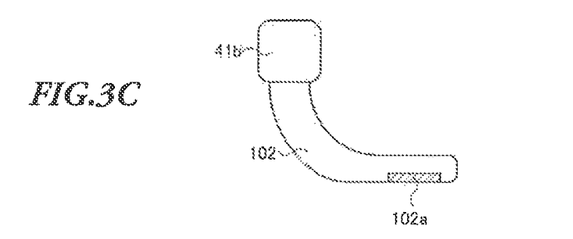
Figure 3D:
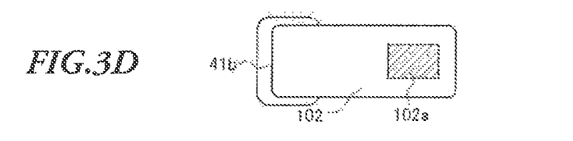

FIG. 3A is a top view illustrating the first airbag body 101 deploying when the passenger protection apparatus according to the embodiment is actuated. FIG. 3B is a front view illustrating the first airbag body 101 deploying when the passenger protection apparatus according to the embodiment is actuated. FIG. 3C is a top view illustrating the second airbag body 102 deploying when the passenger protection apparatus according to the embodiment is actuated. FIG. 3D is a front view illustrating the second airbag body 102 deploying when the passenger protection apparatus according to the embodiment is actuated.

<First Inflator 51a>

The first inflator 51a is configured to generate gas upon receiving an actuating signal sent based on the detection of the collision detector, and to supply the generated gas to the first airbag body 101 to expand the first airbag body 101.

<Second Inflator 51b>

Like the first inflator 51a, the second inflator 51b is configured to generate gas upon receiving an actuating signal sent based on the detection of the collision detector, and to supply the generated gas to the second airbag body 102 to expand the second airbag body 102.

<First Airbag Body 101>

The first airbag body 101 is configured to expand and deploy by the gas injected from the first inflator 51a. One end (fixed side) of the first airbag body 101 is supported by the first storage case 41a, and, when the first airbag body 101 is actuated, the other end (deployment side) is deployed to surround the sitting position of the passenger P.

The first airbag body 101 includes an adhesive area 101*a* on which adhesive is applied. The adhesive area 101*a* is provided on the inward surface facing the passenger P (facing the rear side of the vehicle 1) near the leading end portion (deployment side) of first airbag body 101. That is, adhesive is applied to a predetermined portion of the first airbag body 101, and when the first, airbag body 101 is deployed, the predetermined portion adheres to an adherend. This adhesive has no adhesive force or a low adhesive force at ordinary temperatures, but increases the adhesive force when the temperature is raised.

Moreover, the first airbag body 101 includes a separation part which can be easily torn off in a predetermined direction. This separation part 101*b* has a sufficient strength in the deployment direction of the first airbag body 101, that is, a direction to hold the passenger P, but weak enough to be torn off in a direction perpendicular to the deployment direction of the first airbag body 101, which is different from the direction to hold the passenger P.

For example, the separation part 101*b* made of fibers is strong or thick in the deployment direction of the first airbag body 101, but weak or thin in the direction perpendicular to the deployment direction of the first airbag body 101. Here, with the embodiment, the separation part 101*b* is easily torn off in the direction perpendicular to the deployment direction of the first airbag body 101. However, this is by no means limiting as long as the separation part 101*b* is easily torn off in a direction different from the direction to hold the passenger P.

<Second Airbag Body 102>

The second airbag body 102 is configured to expand and deploy by the gas injected from the second inflator 51*b*. One end (fixed side) of the second airbag body 102 is supported by the second storage case 41*b*, and, when the second airbag body 102 is actuated, the other end (deployment side) is deployed to surround the sitting position of the passenger P.

The second airbag body 102 includes an adhesive area 102*a* on which adhesive is applied. The adhesive area 102*a* is provided on the outward surface opposite to the passenger P (facing the front side of the vehicle 1) near the leading end portion (deployment side) of the second airbag body 102. That is, like the first airbag body 101, adhesive is applied to a predetermined portion of the second airbag body 102, and when the second airbag body 102 is deployed, the predetermined portion adheres to an adherend.

Like the adhesive of the first airbag body 101, this adhesive has no adhesive force or a low adhesive force at ordinary temperatures, but increases the adhesive force when the temperature is raised. The adhesive applied to the first airbag body 101 and the adhesive applied to the second airbag body 102 may be different in property. For example, the adhesive applied to the first airbag body 101 may exert its adhesive force at a high temperature, and the adhesive applied to the second airbag body 102 may exert its adhesive force at a lower temperature than the first, airbag body 101.

Moreover, like the first airbag body 101, the second airbag body 102 may include a separation part. Alternatively, the second airbag body 102 may include a separation part, but the first airbag body 101 may not include the separation part 101*b*.

Here, by actuating the second inflator 51*b* slightly earlier than when the first inflator 51*a* is actuated, the second airbag body 102 is deployed earlier than when the first airbag body 101 is deployed. By this means, the first airbag body 101 and the second airbag body 102 can successfully adhere to one another at a desired position.

In addition, with the embodiment, each of the first airbag body 101 and the second airbag body 102 includes the adhesive area on which adhesive is applied, but this is by no means limiting. One of the first airbag body 101 and the second airbag body 102 may include the adhesive area, and the other may not include the adhesive area and therefore adhesive is not applied to the other. In this case, one of the airbag body 101 and the airbag body 102 which does not include the adhesive area has a corresponding area made of a material or formed in a shape which can easily adhere to the adhesive area. By this means, the first airbag body 101 and the second airbag body 102 can more successfully adhere to one another.

<Operation of Passenger Protection Apparatus 30>

In the passenger protection apparatus 30, when the collision detector detects or predicts a collision of the vehicle 1, an actuating signal is first sent to the second inflator 51*b* to actuate the second inflator 51*b*, and next an actuating signal is sent to the first inflator 51*a* to actuate the first inflator 51*a*.

Upon receiving the actuating signal sent based on the detection or prediction of a collision by the collision detector, the second inflator 51*b* generates gas and supplies the gas to the second airbag body 102. When the second airbag body 102 is supplied with the gas from the second inflator 51*b*, the second airbag body 102 expands and protrudes from the second storage case 42. Then, the second airbag body 102 spreads from the right to surround the passenger P and deploys in front of the passenger P.

Next, upon receiving an actuating signal sent based on the detection or prediction of a collision by the collision detector, the first inflator 51*a* generates gas and supplies the gas to the first airbag body 101. When the first airbag body 101 is supplied with the gas from the first inflator 51*a*, the first airbag body 101 expands and protrudes from the first storage case 41*a*. Then, the first airbag body 101 spreads from the left to surround the passenger P and deploys in front of the passenger P.

Then, the adhesive applied to the adhesive area 102*a* of the second airbag boy 102 is melted by the heat of the gas inputted from the second inflator 51*b*, and then the adhesive area 102*a* of the second airbag body 102 adheres to the inward surface of the first airbag body 101 facing the rear side of the vehicle 1. Also, the adhesive applied to the adhesive area 101*a* of the first airbag body 101 is melted by the heat of the gas inputted from the first inflator 51*a*, and then the adhesive area 101*a* of the first airbag body 101 adheres to the outward surface of the second airbag body 102 facing the front side of the vehicle 1.

As described above, in the passenger protection apparatus 30 according to the embodiment, the adhesive exerts its adhesive function by the heat of the gas from the inflator 50, so that the first airbag body 101 and the second airbag body 102 can adhere to one another. Therefore, it is possible to surely hold the passenger P on the seat 10 in a collision, and cope with various types of collisions in different directions, and consequently to improve the protection performance.

Figure 4A:
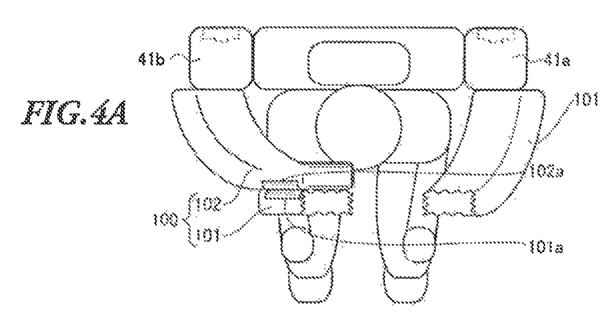
FIG. 4A is a top view illustrating separated airbag bodies.
Figure 4B:
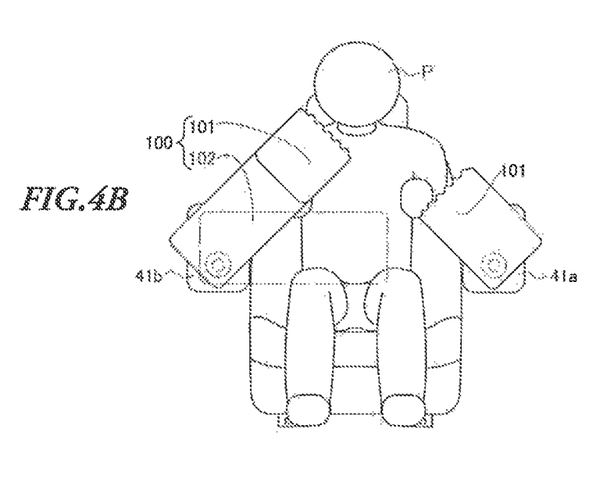
FIG. 4B is a front view illustrating separated airbag bodies.

Next, as illustrated in FIG. 4, after the impact of the collision of the vehicle 1 is absorbed, the first airbag body 101 and the second airbag body 102 stuck together are separated in the vertical direction by the passenger P. The separation part 101*b* of the first airbag body 101 is weak against the force applied in the vertical direction, and therefore can be torn off to separate the first airbag body 101 and the second airbag body 102 from one another.

Therefore, after the impact of the collision is absorbed, the passenger P can be released from the restraint by the passenger protection apparatuses. That is, it is possible to surely hold the passenger P and improve the protection performance in a collision of the vehicle 1, and, after the impact of the collision is absorbed, it is possible to allow the passenger P to readily get out of the vehicle 1.

Here, in the passenger protection apparatus 30 according to the embodiment, adhesive is applied to the inward surface of the first airbag body 101 facing the passenger P and the outward surface of the second airbag body 102 opposite to the passenger P, but this is by no means limiting. Adhesive may be applied to the outward surface of the first airbag body 101 opposite to the passenger P, and the inward surface of the second airbag body 102 facing the passenger P. In this case, it is preferred that the first airbag body 101 is first deployed, and next the second airbag body 102 is deployed. Alternatively, adhesive may be applied to both the inward surface facing the passenger P and the outward surface opposite to the passenger P of each of the first airbag body 101 and the second airbag body 102. In this case, either of the first airbag body 101 and the second airbag body 102 may be deployed first, or they may be deployed at the same time.

<Example of Separation Part>

Figure 5A:
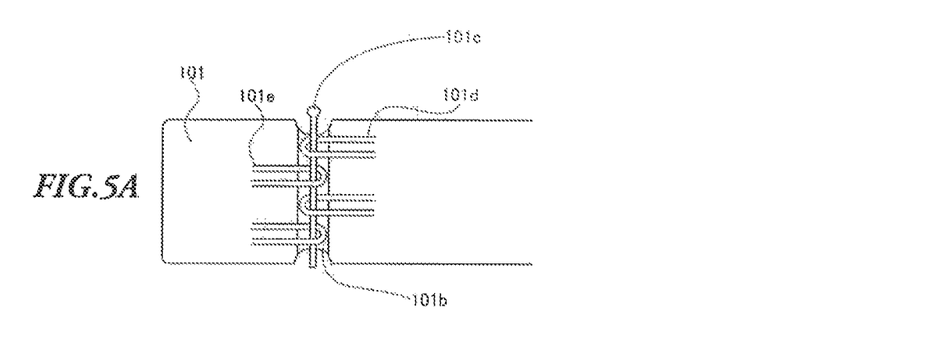
FIGS. 5A-5B are schematic views illustrating an example of a separation part of the airbag body.
Figure 5B:
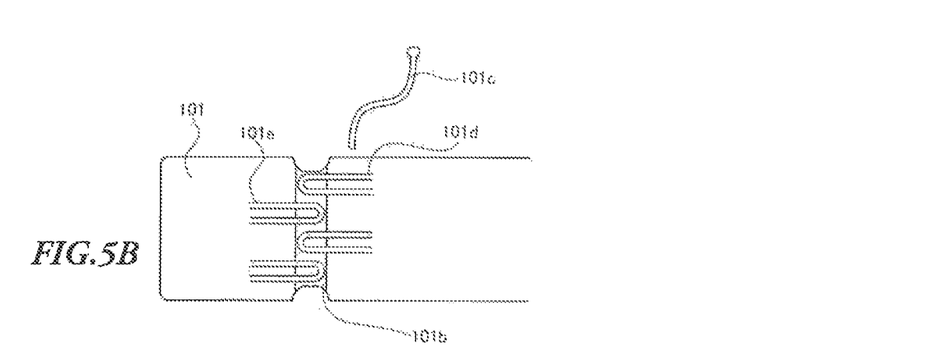

An example of a separation part will be described. FIGS. 5A-5B are schematic views illustrating an example of a separation part.

As illustrated in FIGS. 5A-5B, the separation part 101b includes a tether 101c, weft threads 101d, and weft threads 101e. The tether 101c is a string provided in the direction perpendicular to the deployment direction of the first airbag body 101, that is, provided in the vertical direction.

A plurality of weft threads 101d are provided in the deployment direction of the first, airbag body 101, that is, horizontal direction. In addition, each of the weft threads 101d goes around the tether 101c and returns toward the base end portion of the first airbag body 101. Meanwhile, a plurality of weft threads 101e are provided in the deployment direction of the first airbag body 101, that is, the horizontal direction. In addition, each of the weft threads 101e goes around the tether 101c and returns toward the front end portion of the first airbag body 101.

With this configuration, normally, the weft threads 101d and the weft threads 101e pull the tether 101c in the opposite directions, that: is, from the base end portion side and the front end portion side, respectively, to prevent the separation part 101b from being torn off. Therefore, it is possible to hold the passenger P by the first airbag body 101.

On the other hand, when the tether 101c is pulled out of the first airbag body 101, the weft threads 101d and the weft threads 101e cannot be pulled from one another. By this means, it is possible to easily tear the separation part 101b.

Accordingly, after the impact of the collision of the vehicle 1 is absorbed, the tether 101c is pulled out by the passenger P, so that it is possible to easily tear the first airbag body 101 to separate the first airbag body 101 and the second airbag body 102 from one another. That is, it is possible to surely hold the passenger P and improve the protection performance in a collision of the vehicle 1, and, after the impact of the collision is absorbed, it is possible to allow the passenger P to readily get out of the vehicle 1.

<One-Side Airbag>

Figure 6:
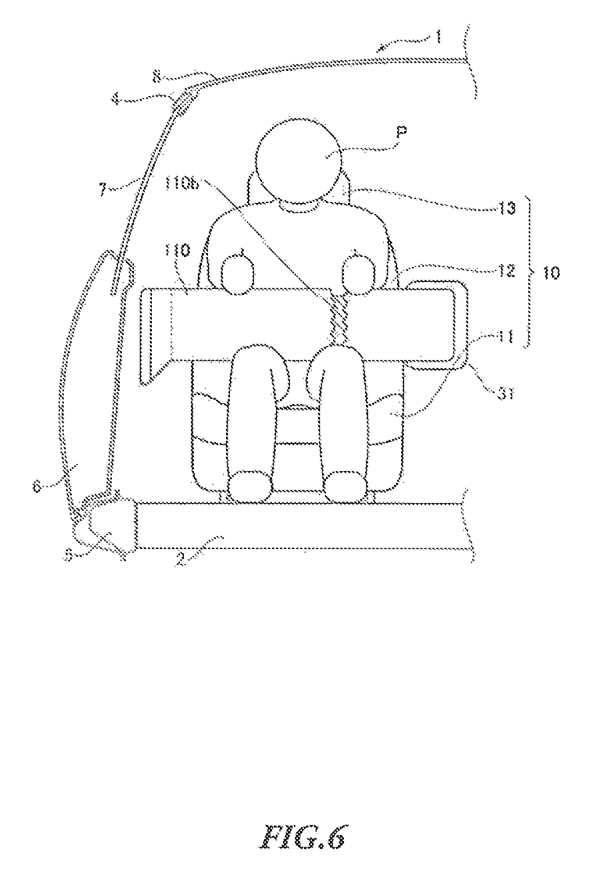
FIG. 6 is a cross-sectional view schematically illustrating a vehicle equipped with a passenger protection apparatus including an airbag body deploying from one side of a passenger.

In addition, with the embodiment, the first airbag body 101 of the passenger protection apparatus 30 is provided on the left side of the passenger P, and the second airbag body 102 of the passenger protection apparatus 30 is provided on the right side of the passenger P, but this is by no means limiting. The airbag body may be provided on only one side of the passenger P. To be more specific, as illustrated in FIG. 6, a passenger protection apparatus 31 may be provided on the left side of the seat 10 (on the right side of the passenger P in FIG. 6), and an inflator and an airbag body 110 may be provided in the passenger protection apparatus 31.

Upon receiving an actuating signal sent based on the detection of the collision detector, the inflator supplies gas to the airbag body 110. When the airbag body 100 is not actuated, it is compactly folded. An adhesive area is provided near the leading end portion of the airbag body 110, and adhesive is applied to the adhesive area. The airbag body 110 includes a separation part 110b, like the embodiment. Then, when the airbag body 110 is supplied with the gas from the inflator, the airbag body 110 is deployed to surround the sitting position of the passenger P. Then, the adhesive is melted by the heat of the gas from the inflator, so that the adhesive area adheres to the front door 6.

By this means, in the passenger protection apparatus 31, the adhesive exerts its adhesive function by the heat of the gas from the inflator, and therefore it is possible to surely hold the passenger P on the seat 10, and consequently to improve the protection performance. In addition, the airbag body 110 is pulled up after the airbag is deployed, that is, after the impact of the collision is absorbed. By this means, the separation part 110b is torn off to release the passenger P from the restraint. Therefore, it is possible to surely hold the passenger P and improve the protection performance in a collision of the vehicle 1, and, after the impact of the collision is absorbed, it is possible to allow the passenger P to readily get out of the vehicle 1.

<Separation Part Provided Around Adhesive Area>

Figure 7A:
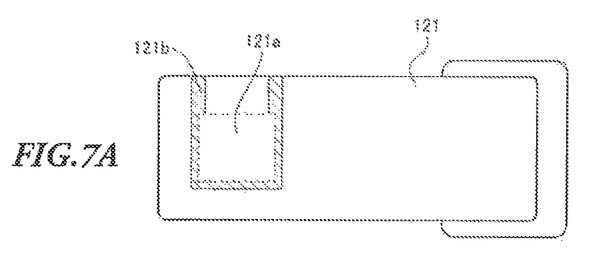
FIGS. 7A-B are front views illustrating a first airbag body including a separation part provided around an adhesive area.
Figure 7B:
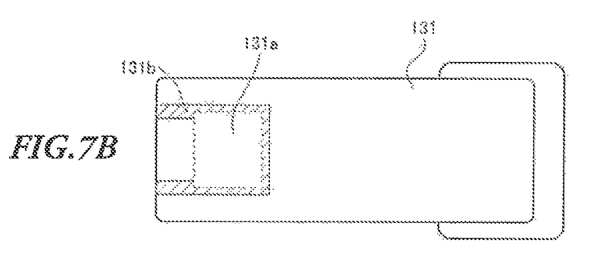
Figure 8A:
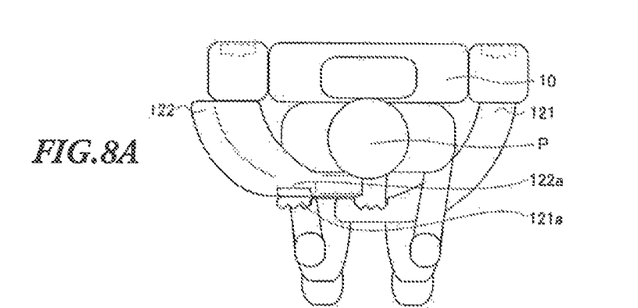
FIGS. 8A and 8C are top views illustrating the torn airbag body.
Figure 8B:
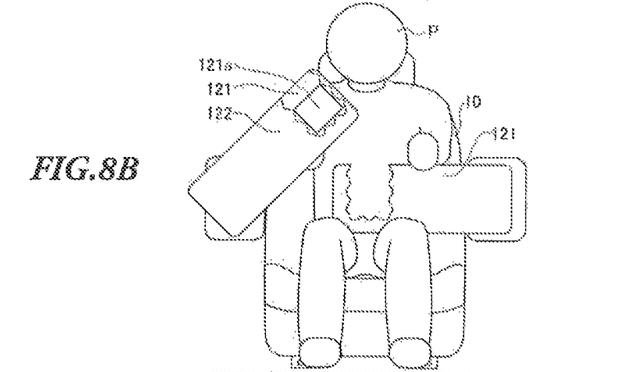
FIG. 8B is a front view illustrating the torn airbag body.
Figure 8C:
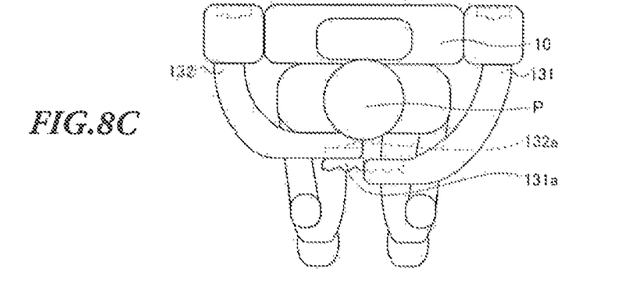

Next, a configuration where a separation part is provided around an adhesive area will be described. FIGS. 7A-7B are front views illustrating a first airbag body including a separation part provided around an adhesive area. FIGS. 8A and 8C are top views illustrating the torn airbag body. FIG. 8B is a front view illustrating the torn airbag body. Here, FIG. 7A is a front view illustrating the first airbag body including the separation part vertically disposed. FIG. 7B is a front view illustrating the first airbag body including the separation part horizontally disposed. FIG. 8A is a top view illustrating the airbag body including the vertical separation part which is torn off. FIG. 8B is a front, view illustrating the airbag body including the vertical separation part which is torn off. FIG. 8C is a top view illustrating the airbag body including the horizontal separation part which is torn off.

Airbag Body Including Separation Part Vertically Disposed

<First Airbag Body 121>

As illustrated in FIG. 7A, a first airbag body 121 includes an adhesive area 121a, and a separation part 121b provided around the adhesive area 121a. The separation part 121b surrounds the adhesive area 121a and extends from both sides of the adhesive area 121a to the upper end of the first airbag body 121.

Here, with the embodiment, the separation part 121b extends from both sides of the adhesive area 121a to the upper end of the first airbag body 121. However, this is by no means limiting, and the separation part 121b may extend to the lower end of the first airbag body 121. In addition, the separation part 121b is provided in the first airbag body 121, but this is by no means limiting. The separation part 121b may be provided in a second airbag body 122. Alternatively, the first airbag body 121 and the second airbag body 122 may include separation parts, respectively.

Then, after the impact of the collision of the vehicle 1 is absorbed, the passenger P pulls the first airbag body 121 and the second airbag body 122 away from one another as illustrated in FIGS. 8A and 8B. By this means, the adhesive area 121a of the first airbag body 121 is torn off from the separation part 121b of the first airbag body 121 while adhering to the second airbag body 122, and therefore the first, airbag body 121 and the second airbag body 122 are separated from one another.

Accordingly, after the impact of the collision of the vehicle 1 is absorbed, it is possible to easily tear the first airbag body 121 to separate the first, airbag body 121 and the second airbag body 122 from one another. That is, it is possible to surely hold the passenger P and improve the protection performance in a collision of the vehicle 1, and, after the impact of the collision is absorbed, it is possible to allow the passenger P to readily get out of the vehicle 1.

Airbag Body Including Separation Part Horizontally Disposed

<First Airbag Body 131>

As illustrated in FIG. 7B, a first airbag body 131 includes an adhesive area 131a, and a separation part 131b provided around the adhesive area 131a. The separation part 131b surrounds the adhesive area 131a and extends from the top and the bottom of the adhesive area 131a to the lateral side of the first airbag body 131.

Here, with the embodiment, the separation part 131b is provided in the first airbag body 131, but this is by no means limiting. The separation part 131b may be provided in a second airbag body 132. Alternatively, the first airbag body 131 and the second airbag body 132 may include separation parts, respectively.

Then, after the impact of the collision of the vehicle 1 is absorbed, the passenger P pulls the first airbag body 131 and the second airbag body 132 away from one another as illustrated in FIG. 8C. By this means, the adhesive area 131a of the first airbag body 131 is torn off from the separation part 131b of the first airbag body 131 while adhering to the second airbag body 132, and therefore the first airbag body 131 and the second airbag body 132 are separated from, one another. Here, the first airbag body 131 and the second airbag body 132 do not necessarily completely separate from one another, as long as the perimeter of the first airbag body 131 and the second airbag body 132 is long enough to allow the passenger P to easily slip through the first airbag body 131 and the second airbag body 132.

Therefore, after the impact of the collision of the vehicle 1, the passenger P can easily leave off the first airbag body 131 and the second airbag body 132. That is, it is possible to surely hold the passenger P and improve the protection performance in a collision of the vehicle 1, and, after the impact of the collision is absorbed, it is possible to allow the passenger P to readily get out of the vehicle 1.

Figure 9A:
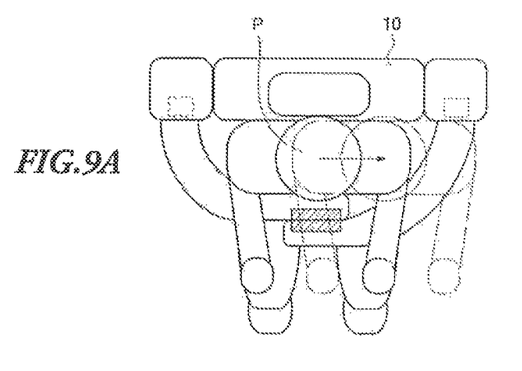
FIG. 9A is a top view illustrating the airbag bodies separated by repetitive motions.
Figure 9B:
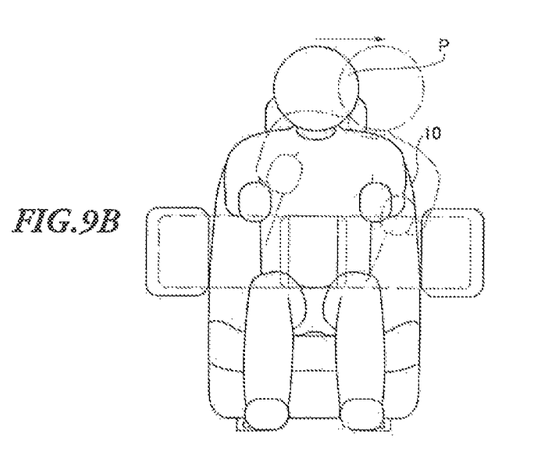
FIG. 9B is a front view illustrating the airbag bodies separated by repetitive motions.
Figure 10A:
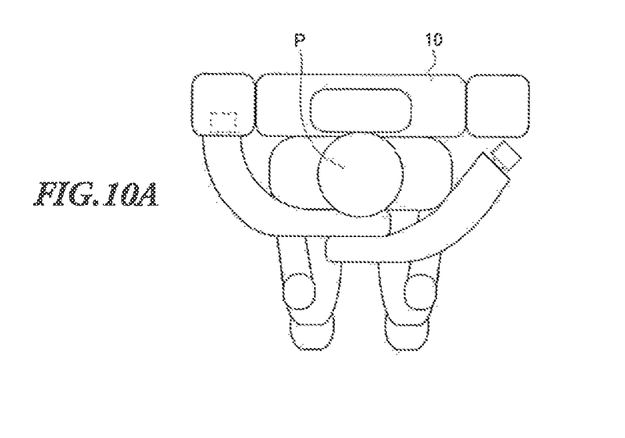
FIG. 10A is a top view illustrating an airbag body torn off at its base end portion.
Figure 10B:
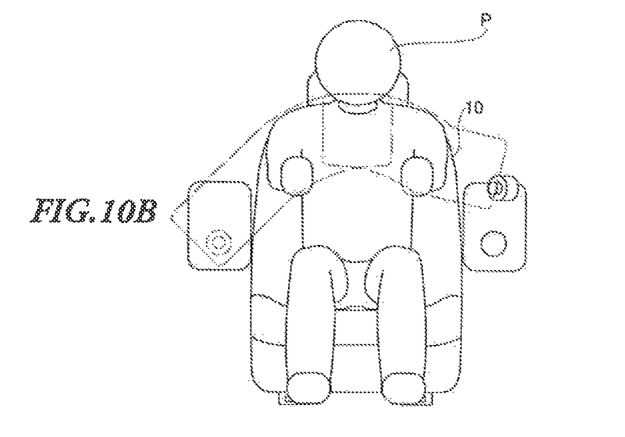
FIG. 10B is a front view illustrating an airbag body torn off at its base end portion.

In addition, with the embodiment, the airbag body cars be easily torn off by one operation or a simple operation, but this is by no means limiting. The airbag body may be torn off by repetitive motions of the passenger P in a predetermined direction as illustrated in FIGS. 9A-9B, complicated motions, or a plurality of operations. Moreover, with the above-described examples, the airbag body is torn off in its middle part, but this is by no means limiting. The airbag body may be torn off at its base end portion as illustrated in FIGS. 10A-10B.

With the embodiment, in the passenger protection apparatus, the adhesive exerts its adhesive function by the heat of the gas from the inflator, and therefore it is possible to stick the first airbag body and the second airbag body together. Therefore, it is possible to surely hold the passenger P on the seat 10 in a collision, and cope with various types of collisions in different directions, and consequently to improve the protection performance. Moreover, it is possible to allow the passenger P to readily get out of the vehicle 1 after the impact of the collision is absorbed.

The invention claimed is:

1. A passenger protection apparatus for a vehicle comprising:
    an inflator configured to generate gas upon receiving a predetermined actuating signal; and
    an airbag body folded and stored in an unactuated condition, and configured to deploy by supplying the gas from the inflator to the airbag body, the airbag body comprising a predetermined area on which adhesive is applied,
    wherein upon deployment of the airbag body, the predetermined area adheres to an adherend to hold a passenger, and, after the deployment, the airbag body is torn off by a predetermined motion.

2. The passenger protection apparatus for a vehicle according to claim 1, wherein the airbag body comprises a separation part that can be torn off in a direction different from a direction to hold the passenger.

3. The passenger protection apparatus for a vehicle according to claim 1, wherein after the deployment, part of the airbag body is torn off by a motion in a predetermined direction different from a direction to hold the passenger to release the passenger from restraint.

4. The passenger protection apparatus for a vehicle according to claim 1, wherein after the deployment, part of the airbag body is torn off by repetitive motions in a predetermined direction to release the passenger from restraint.

* * * * *